United States Patent
Yamamoto

Patent Number: 5,798,874
Date of Patent: Aug. 25, 1998

[54] IMAGING LENS

[75] Inventor: Chikara Yamamoto, Omiya, Japan

[73] Assignee: Fuji Photo Optical Co., Ltd., Omiya, Japan

[21] Appl. No.: 889,894

[22] Filed: Jul. 8, 1997

Related U.S. Application Data

[62] Division of Ser. No. 653,692, May 23, 1996, Pat. No. 5,699,202.

[30] Foreign Application Priority Data

Jul. 14, 1995 [JP] Japan ................... 7-201630

[51] Int. Cl.$^6$ .................. G02B 9/62; G02B 9/12
[52] U.S. Cl. .................. 359/761; 359/784; 359/754
[58] Field of Search ............... 359/761, 784, 359/754, 770, 781

[56] References Cited

U.S. PATENT DOCUMENTS

| | | | |
|---|---|---|---|
| 4,749,263 | 6/1988 | Taniguchi et al. | 359/784 |
| 4,761,064 | 8/1988 | Mercado et al. | 359/784 |
| 4,765,727 | 8/1988 | Mercado | 359/756 |
| 4,772,108 | 9/1988 | Sugiyama | 359/761 |
| 4,787,721 | 11/1988 | Fukushima et al. | 359/758 |
| 5,204,782 | 4/1993 | Mercado et al. | 359/754 |

Primary Examiner—Georgia Y. Epps
Assistant Examiner—Evelyn A. Lester
Attorney, Agent, or Firm—Ronald R. Snider

[57] ABSTRACT

A first lens group having a four-lens configuration of positive, negative, negative, and positive lenses and a second lens group comprising at least two lenses are disposed successively from the object side, while these lenses are made of at least two kinds of glass materials having a difference in dispersion therebetween smaller than 0.0055, thereby yielding an imaging lens with a high brightness and a wide field angle which can favorably correct various kinds of aberration. From the object side, the first lens group, in which a positive first lens L1, a negative second lens L2, a negative third lens L3, and a positive fourth lens L4 are successively arranged, and the second lens group comprising three lenses L5, L6, and L7 are disposed. The difference in dispersion between the materials forming the lenses L1 to L7 is made smaller than 0.0055, while the lenses are configured so as to satisfy the following conditional expressions:

$-0.2 < F/F1 < 1.0,\ -0.1 < F/F2 < 1.4,\ 0.8 < F/fa < 2.0,$ $0.5 < |F/fb| < 1.5,\ 1.6 < F/fc < 3.0,\ 1.0 < F/fd < 2.5$

3 Claims, 17 Drawing Sheets

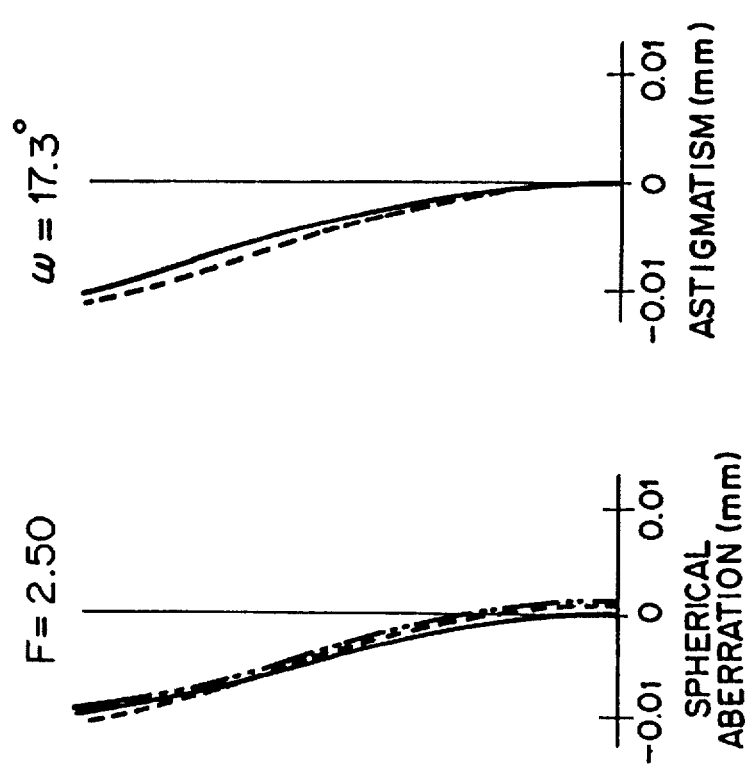
FIG. 10A
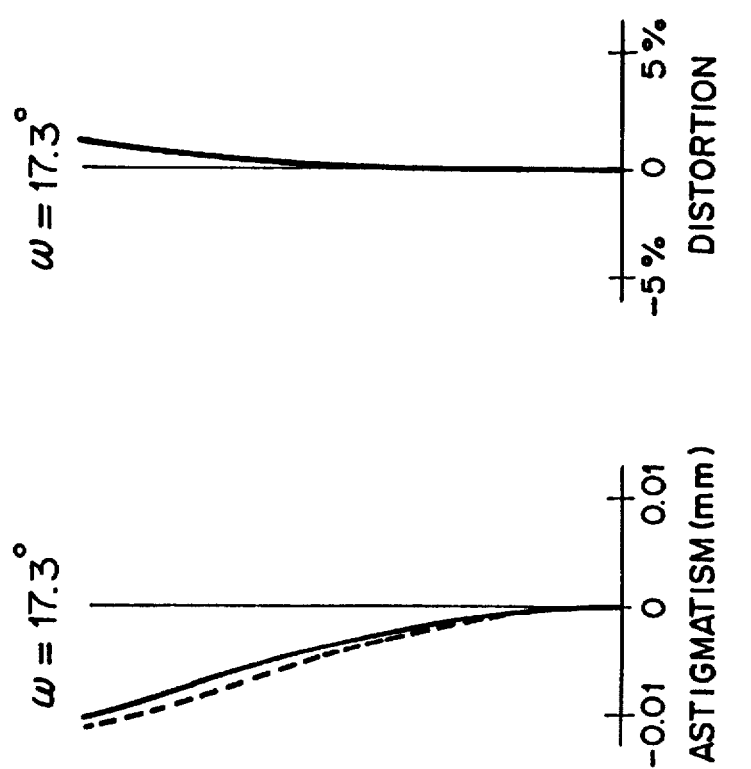
FIG. 10B
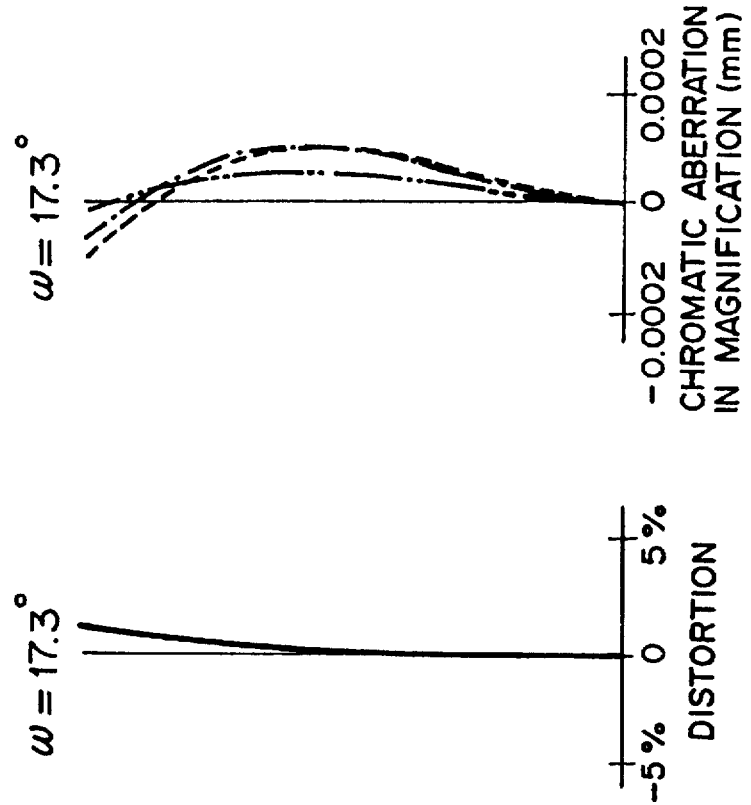
FIG. 10C
FIG. 10D

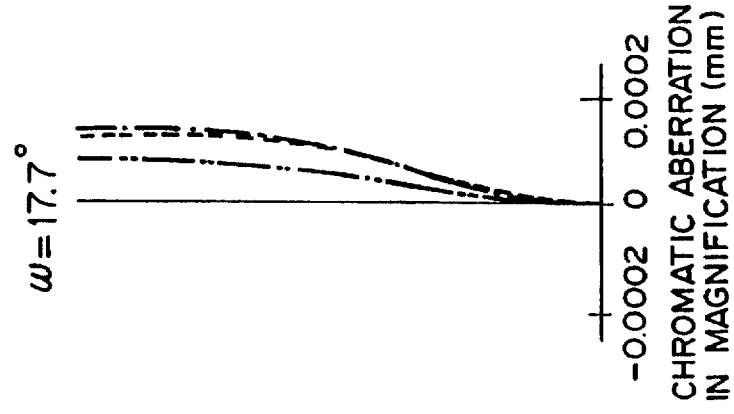
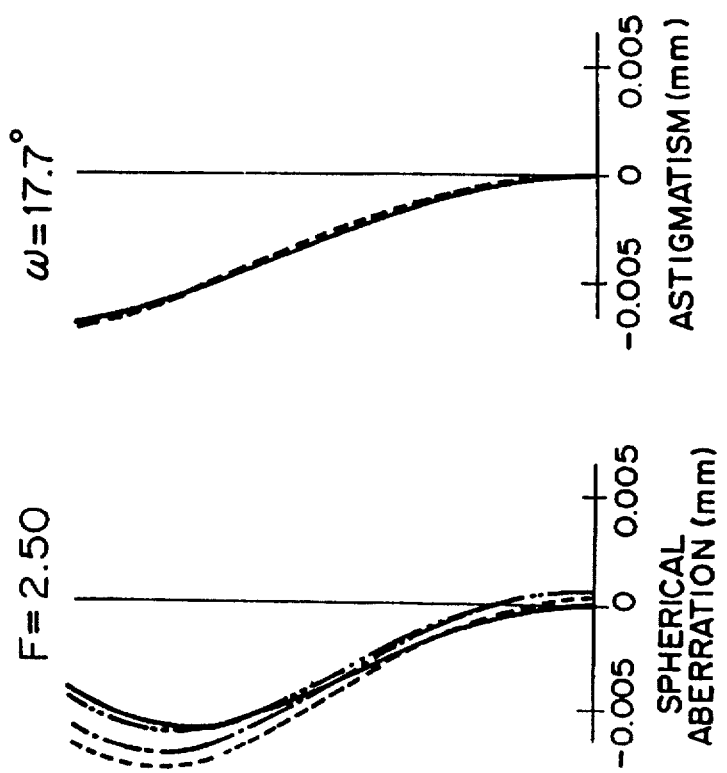
FIG. 13A  FIG. 13B  FIG. 13C  FIG. 13D

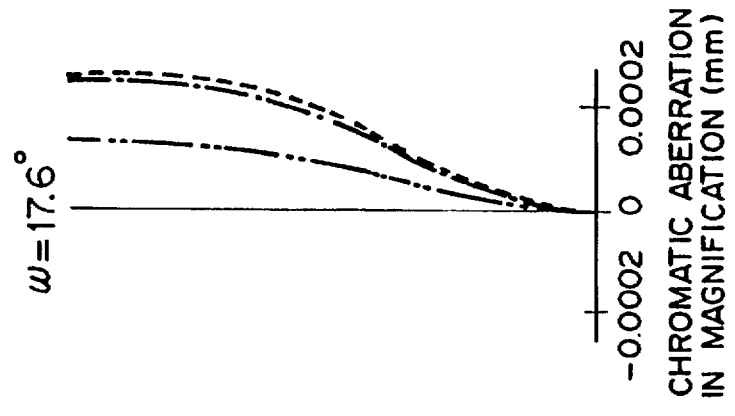
FIG. 14D
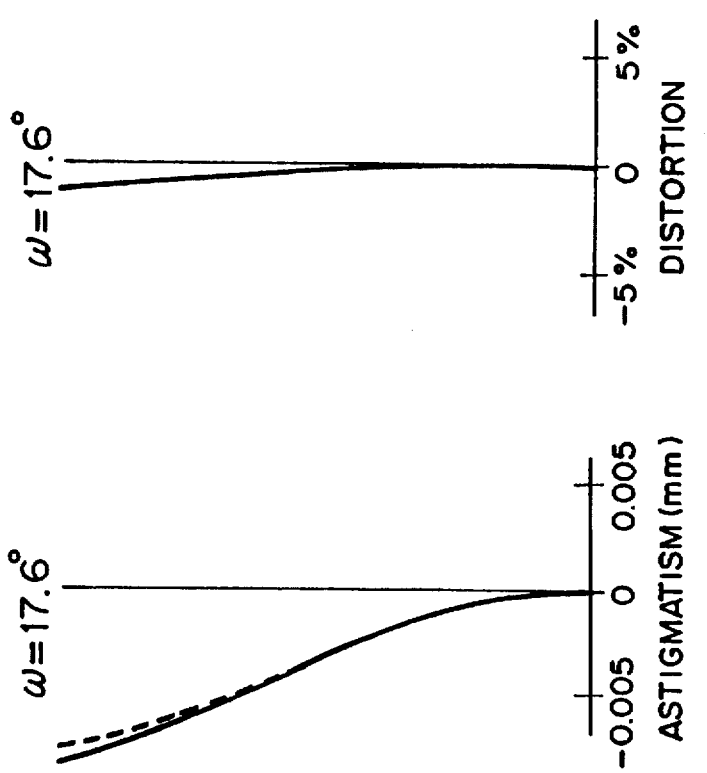
FIG. 14C
FIG. 14B
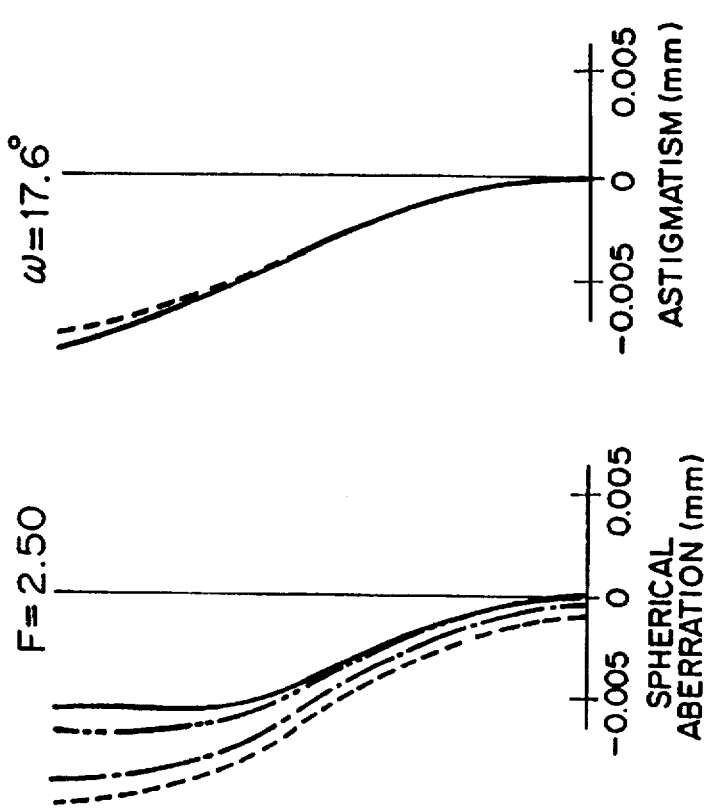
FIG. 14A

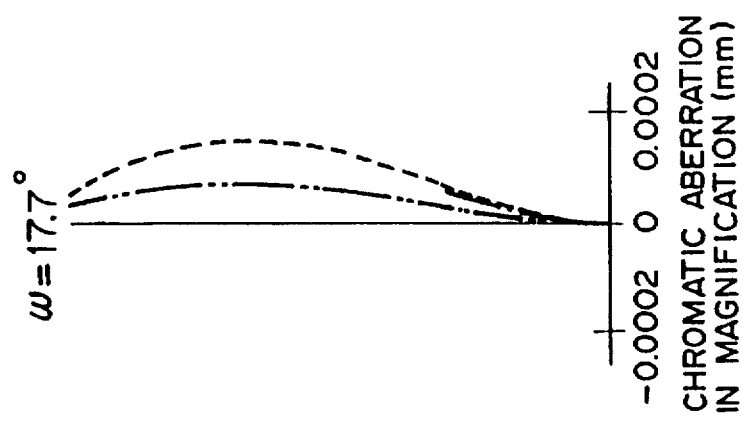
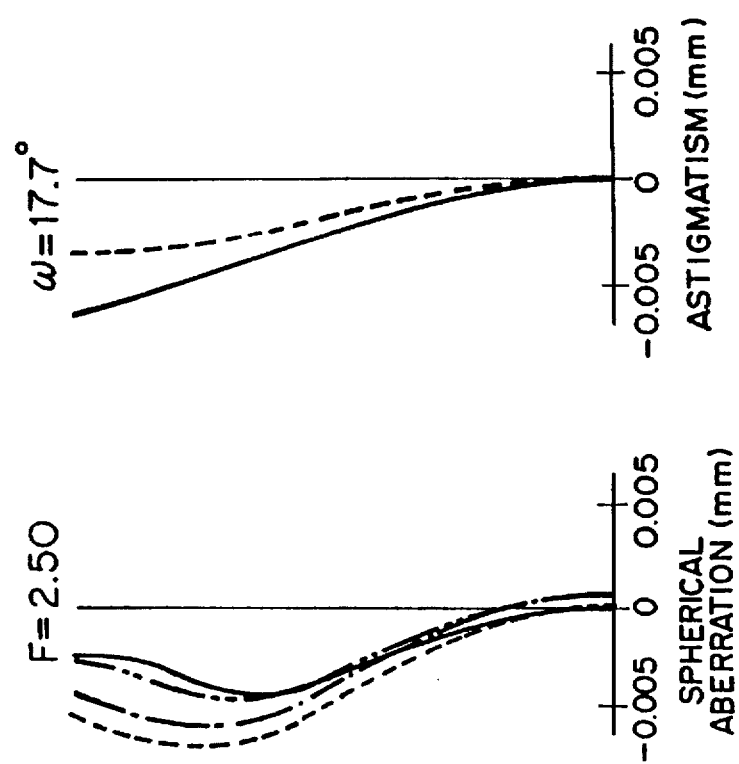
FIG. 15A  FIG. 15B  FIG. 15C  FIG. 15D

IMAGING LENS

RELATED APPLICATIONS

This application is a Divisional of U.S. patent application Ser. No. 08/653,692 filed on May 23, 1996 which is now U.S. Pat. No. 5,699,202.

This application claims the priority of Japanese Patent Application No. 7-201630 filed on Jul. 14, 1995, which is incorporated herein by reference.

BACKGROUND OF THE INVENTION

1. Field of the Invention

The present invention relates to an imaging lens used for various cameras such as video cameras using CCD, image pickup tubes, and the like and photographic cameras in which an object image is formed on a silver halide film and, in particular, to an imaging lens which is suitably used in ultraviolet region.

2. Description of the Prior Art

Conventionally, in lenses used in ultraviolet region, glass materials therefor have been quite limited in order to attain favorable light transmittance. As a result, glass materials made of crystals of fluorite or quartz are mostly used therefor.

In the lenses made of such limited glass materials, chromatic aberration is hard to decrease since it is difficult to attain a large difference in dispersion between the lens forming materials. Also, due to the low refractive index of the above-mentioned crystals, their Petzval's sum tends to become large. Accordingly, they are mainly used as lenses having a narrow field angle such as objective lenses for microscope and not always suitable for camera lenses. Further, depending on their crystal configuration, it is difficult to form a surface having a small radius of curvature with a high accuracy. Also, there is a problem that only convex surfaces can be polished. Thus, it is further difficult to correct their aberration.

Japanese Unexamined Patent Publication No. 48-34531 discloses an imaging lens for improving these problems.

While the imaging lens disclosed in the above-mentioned publication has a field angle of 29 degrees which is broader than that of the conventional lenses, it is still not always sufficient. Also, it may not be sufficient in terms of brightness and correction of Petzval's sum. Further, it may be insufficient in terms of correction of chromatic aberration, in particular, in ultraviolet region.

SUMMARY OF THE INVENTION

In view of such a circumstance, the object of the present invention is to provide an imaging lens which has a broad field angle and a high brightness and can favorably correct chromatic aberration while keeping the Petzval's sum low, when a plurality of glass materials having a low refractive index and a small difference in dispersion therebetween at a wavelength band in use are used.

In order to achieve the above-mentioned object, a first imaging lens of the present invention comprises a first lens group and a second lens group arranged successively from an object side. The first lens group comprises, successively from the object side, a positive first lens, a negative second lens, a negative third lens, and a positive fourth lens; whereas the second lens group comprises at least two lenses. This imaging lens is configured such that the difference in dispersion between materials constituting the lenses is smaller than 0.0055 and that the following conditional expressions are satisfied:

$$-0.2 < F/F1 < 1.0 \qquad (1)$$

$$-0.1 < F/F2 < 1.4 \qquad (2)$$

$$0.8 < F/fa < 2.0 \qquad (3)$$

$$0.5 < |F/fb| < 1.5 \qquad (4)$$

$$1.6 < |F/fc| < 3.0 \qquad (5)$$

$$1.0 < F/fd < 2.5 \qquad (6)$$

A second imaging lens of the present invention comprises a first lens group, a second lens group, and a third lens group arranged successively from an object side. The first lens group is negative as a whole. The second lens group comprises, successively from the object side, a positive first lens, a negative second lens, a negative third lens, and a positive fourth lens. The third lens group comprises at least two lenses. This imaging lens is configured such that the difference in dispersion between materials constituting the lenses is smaller than 0.0055 and that the following conditional expressions are satisfied:

$$-6 < F/F1 < 0.0 \qquad (7)$$

$$0.0 < F/F2 < 1.4 \qquad (8)$$

$$-0.6 < F/F3 < 1.5 \qquad (9)$$

$$0.8 < F/fa < 2.0 \qquad (10)$$

$$0.0 < |F/fb| < 1.5 \qquad (11)$$

$$1.4 < |F/fc| < 3.0 \qquad (12)$$

$$1.0 < F/fd < 2.5 \qquad (13)$$

In the above-mentioned conditional expressions (1) to (13):

F: focal length as a whole;

F1: focal length of the first lens group;

F2: focal length of the second lens group;

F3: focal length of the third lens group;

fa: focal length of the positive lens on the object side in the first lens group in the first imaging lens or in the second lens group in the second imaging lens;

fb: focal length of the negative lens on the object side in the first lens group in the first imaging lens or in the second lens group in the second imaging lens;

fc: focal length of the negative lens on the image side in the first lens group in the first imaging lens or in the second lens group in the second imaging lens; and fd: focal length of the positive lens on the image side in the first lens group in the first imaging lens, or in the second lens group in the second imaging lens.

In the above-mentioned two imaging lenses, desirably, the light transmittance of the material forming each lens with respect to light having a wavelength of 300 to 800 nm is set to 50% or higher when the material has a thickness of 10 mm.

In particular, desirably, fluorite and quartz are used as materials for forming the above-mentioned lenses such that the first and fourth lenses in the first lens group in the first imaging lens or in the second lens group in the second imaging lens are made of fluorite, whereas the second and third lenses therein are made of quartz.

Here, the dispersion of the material forming the above-mentioned lens is defined as follows:

dispersion in lens material=NF—NC wherein NF is refractive index of the lens material with respect to F—line (wavelength at 486.13 nm) and NC is refractive index of the lens material with respect to C—line (wavelength at 656.27 nm).

Also, at least two lenses may be bonded to each other in the four lenses constituting the first lens group in the first imaging lens or the four lenses constituting the second lens group in the second imaging lens. Alternatively, all of these four lenses may be separated from each other.

BRIEF DESCRIPTION OF THE DRAWINGS

FIG. 10 is an aberration chart of the lens in accordance with Embodiment 2;

FIG. 13 is an aberration chart of the lens in accordance with Embodiment 5;

FIG. 14 is an aberration chart of the lens in accordance with Embodiment 6;

FIG. 15 is an aberration chart of the lens in accordance with Embodiment 7;

DETAILED DESCRIPTION OF THE PREFERRED EMBODIMENTS

In the following, embodiments of the present invention will be explained with reference to drawings. While eight embodiments will be specifically explained in the following, in the explanation of the drawings corresponding to the respective embodiments, elements identical to each other will be referred to with marks identical to each other without repeating their overlapping explanations.

(Embodiment 1)

Figure 1:
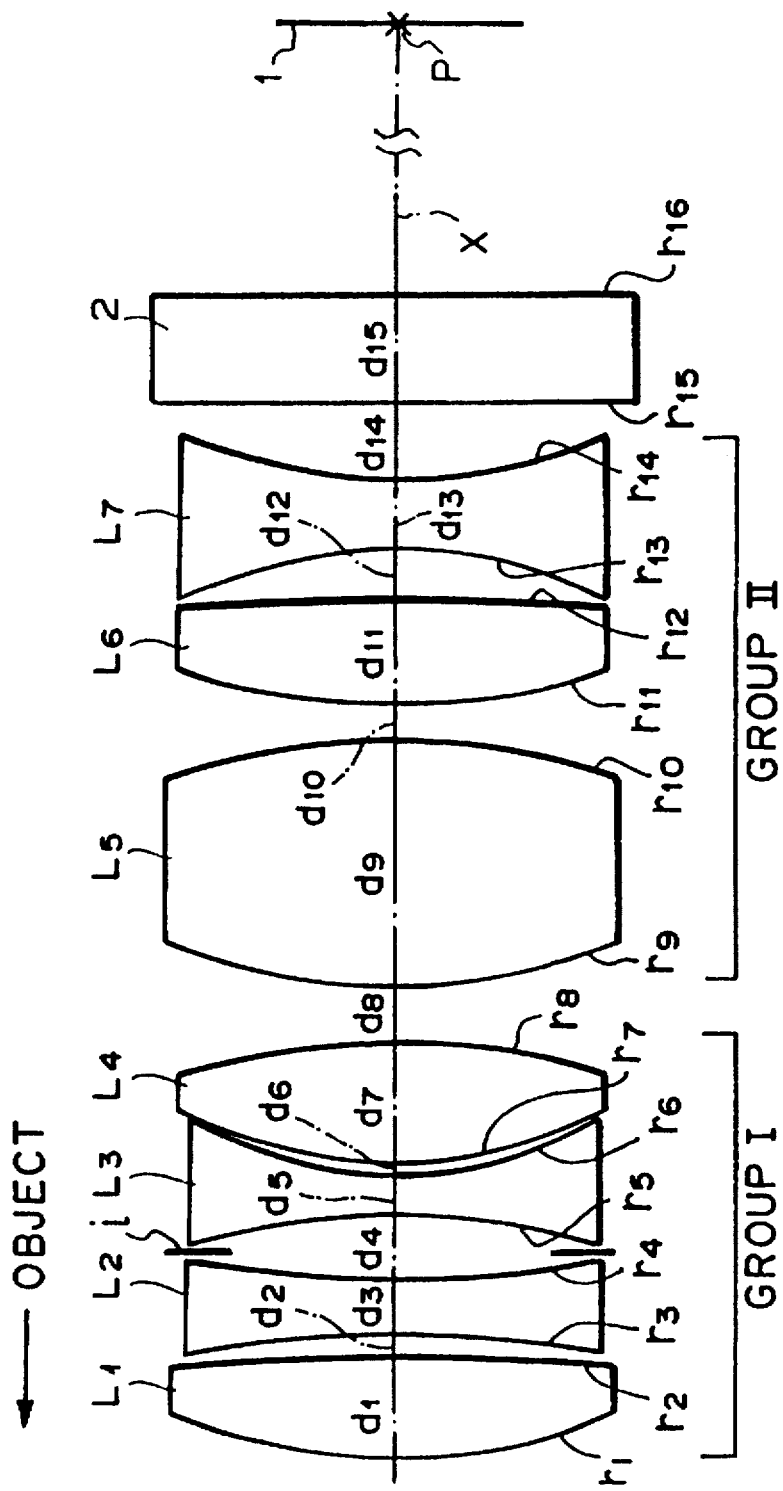
FIG. 1 is a schematic view showing a basic lens configuration in accordance with Embodiment 1 of the present invention.

As shown in FIG. 1, the imaging lens of this embodiment comprises a first lens group and a second lens group arranged successively from an object side. The first lens group comprises, successively from the object side, a positive first lens L1, a negative second lens L2, a negative third lens L3, and a positive fourth lens L4; whereas the second lens group comprises three lenses L5, L6, and L7. This imaging lens is configured such that the difference in dispersion between materials constituting the lenses L1 to L7 is smaller than 0.0055 and that the following conditional expressions are satisfied:

$$-0.2 < F/F1 < 1.0 \tag{1}$$

$$-0.1 < F/F2 < 1.4 \tag{2}$$

$$0.8 < F/fa < 2.0 \tag{3}$$

$$0.5 < |F/fb| < 1.5 \tag{4}$$

$$1.6 < |F/fc| < 3.0 \tag{5}$$

$$1.0 < F/fd < 2.5 \tag{6}$$

wherein:

F: focal length as a whole;

F1: focal length of the first lens group;

F2: focal length of the second lens group;

fa: focal length of the positive lens on the object side in the first lens group;

fb: focal length of the negative lens on the object side in the first lens group;

fc: focal length of the negative lens on the image side in the first lens group; and fd: focal length of the positive lens on the image side in the first lens group.

Here, an incident luminous flux along an optical axis X from the object side forms an image at an imaging position P on an imaging surface 1. Also, a stop i is disposed between the second lens L2 and the third lens L3, while a cover glass 2 is disposed on the imaging surface side of the lens system.

Here, each of the first lens L1 and the fourth lens L4 is a biconvex lens whose surface having a stronger curvature is directed toward the object; each of the second lens L2 and the third lens L3 is a biconcave lens whose surface having a stronger curvature is directed toward the image surface; each of the fifth lens L5 and the sixth lens L6 is a biconvex lens whose surface having a stronger curvature is directed toward the object; and the seventh lens L7 is a biconcave lens whose surface having a stronger curvature is directed toward the object.

Next, the above-mentioned conditional expressions (1) to (6) will be explained.

When F/F1 is below the lower limit of conditional expression (1), the negative power of the first lens group becomes so strong that the number of lenses has to be increased in order to correct aberration in the second lens group, whereby the correction of chromatic aberration may become insufficient. When F/F1 exceeds its upper limit, by contrast, the positive power of the first lens group becomes so strong that the radius of curvature of its convex surface may be too small to secure correction of aberration and surface accuracy of the lenses, while back focus is shortened. Accordingly, in this embodiment, the value of F/F1 is set to 0.10 as shown in Table 9 so as to satisfy conditional expression (1), thereby attaining favorable correction of aberration, in particular, such as chromatic aberration. Therefore, the number of the lenses can be reduced, while the surface accuracy of the lenses can be secured.

Also, in this imaging lens, while the second lens group having a low axial ray height is used for correcting the Petzval's sum, when F/F2 exceeds the upper limit of the above-mentioned conditional expression (2), the positive power of the second lens group becomes so strong that the Petzval's sum increases to an extent where the image surface is hard to correct. Below the lower limit, by contrast, the negative power of the second lens group becomes so strong that back focus is shortened, while coma and distortion are hard to correct. Accordingly, in this embodiment, the value of F/F2 is set to 0.94 as shown in Table 9 so as to satisfy conditional expression (2), thereby attaining favorable correction of aberration, in particular, such as image surface, coma, or distortion, while securing a predetermined back focus length.

Also, while the first lens group mainly corrects chromatic aberration and spherical aberration, beyond the upper limits of conditional expressions (3), (4), (5), and (6), its lens power becomes so strong that the radius of curvature of its lens surface may be too small to secure favorable correction of spherical aberration and surface accuracy. Below the lower limits thereof, by contrast, the lens power thereof becomes too weak to sufficiently correct chromatic aberration. Accordingly, in this embodiment, values of F/fa, |F/fb|, |F/fc|, and F/fd are respectively set to 1.14, 0.96, 2.06, and 1.70 as shown in Table 9 so as to satisfy conditional expressions (3), (4), (5), and (6), thereby attaining favorable correction of aberration, in particular, such as spherical aberration or chromatic aberration, while making it possible to secure the surface accuracy of the lenses.

Also, while crystals of fluorite, quartz, and the like having favorable light transmittance ratios in ultraviolet region can be used as materials for forming lenses, even when the lenses are formed by such lens forming materials having a small difference in dispersion therebetween, various kinds of aberration can be made favorable.

Further, in the case where, as the material for forming each lens, a material having a light transmittance of 50% or higher with respect to light having a wavelength of 300 to 800 nm when the material has a thickness of 10 mm is selected, it is possible to form a lens which can be suitably used within the range from ultraviolet region to visible light region.

The following Table 1 shows radius of curvature r (mm) of each lens surface, center thickness of each lens and air gap between neighboring lenses d (mm), and refractive index N of each lens at i—line.

Here, the numbers in Table 1 and Tables 2 to 8, which will be explained later, identifying the marks r, d, and N successively increase from the object side.

Also, in this embodiment, F number and half field angle ω of the imaging lens are 2.50 and 17.3°, respectively.

(Embodiment 2)

Figure 2:
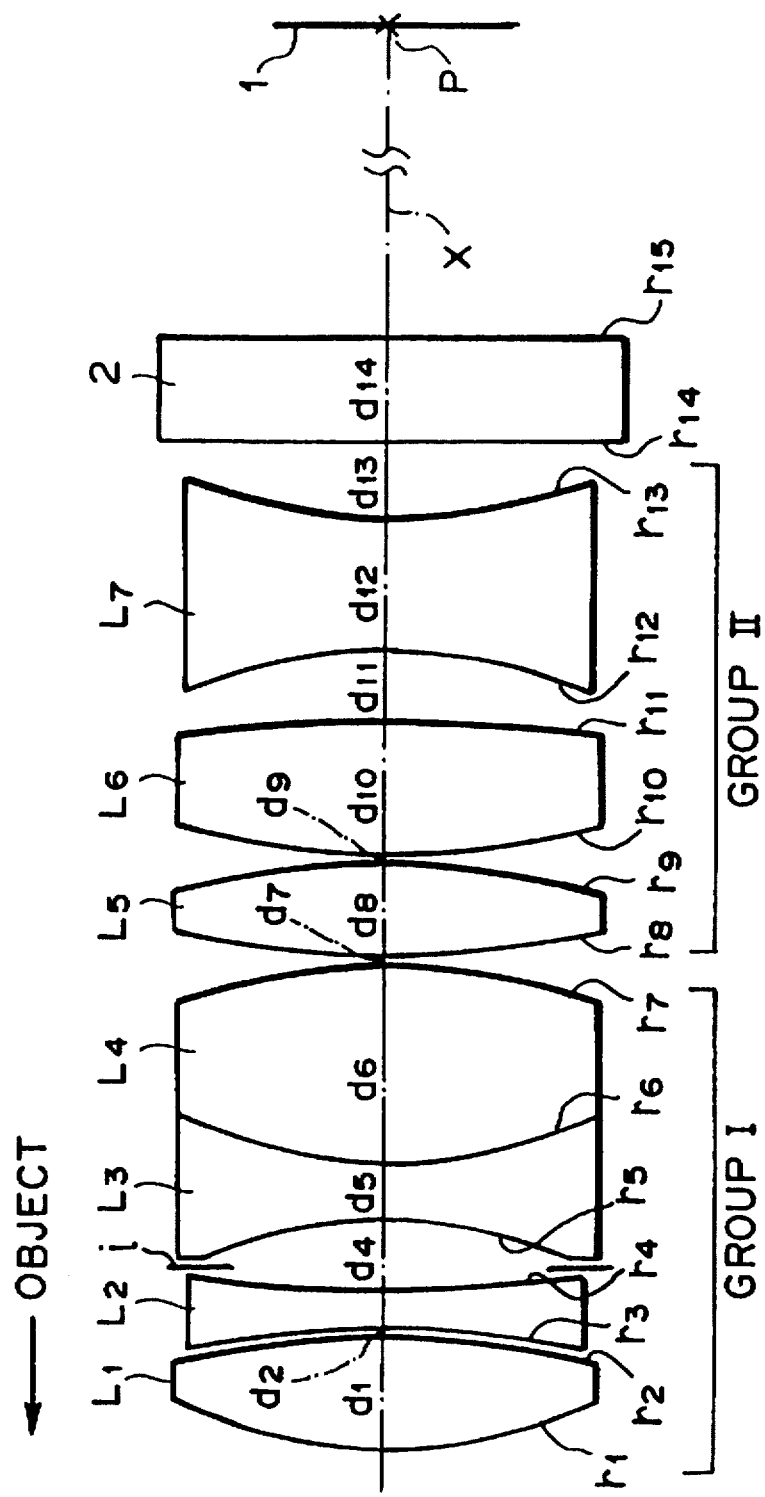
FIG. 2 is a schematic view showing a basic lens configuration in accordance with Embodiment 2 of the present invention.

The imaging lens of Embodiment 2 will be explained with reference to FIG. 2.

The imaging lens of Embodiment 2 has a seven-lens configuration which is substantially the same as that of the imaging lens of the above-mentioned Embodiment 1 but mainly differs therefrom in that the surface having a stronger curvature in each of the second lens L2 and the third lens L3 is directed toward the object and that the third lens L3 and the fourth lens L4 are bonded together.

Here, all of the above-mentioned conditional expressions (1) to (6) are satisfied, while their respective values are set as shown in Table 9.

Also, in this embodiment, F number and half field angle ω of the imaging lens are 2.50 and 17.3°, respectively.

The following Table 2 shows radius of curvature r (mm) of each lens surface, center thickness of each lens and air gap between neighboring lenses d (mm), and refractive index N of each lens at i—line in this embodiment.

(Embodiment 3)

Figure 3:
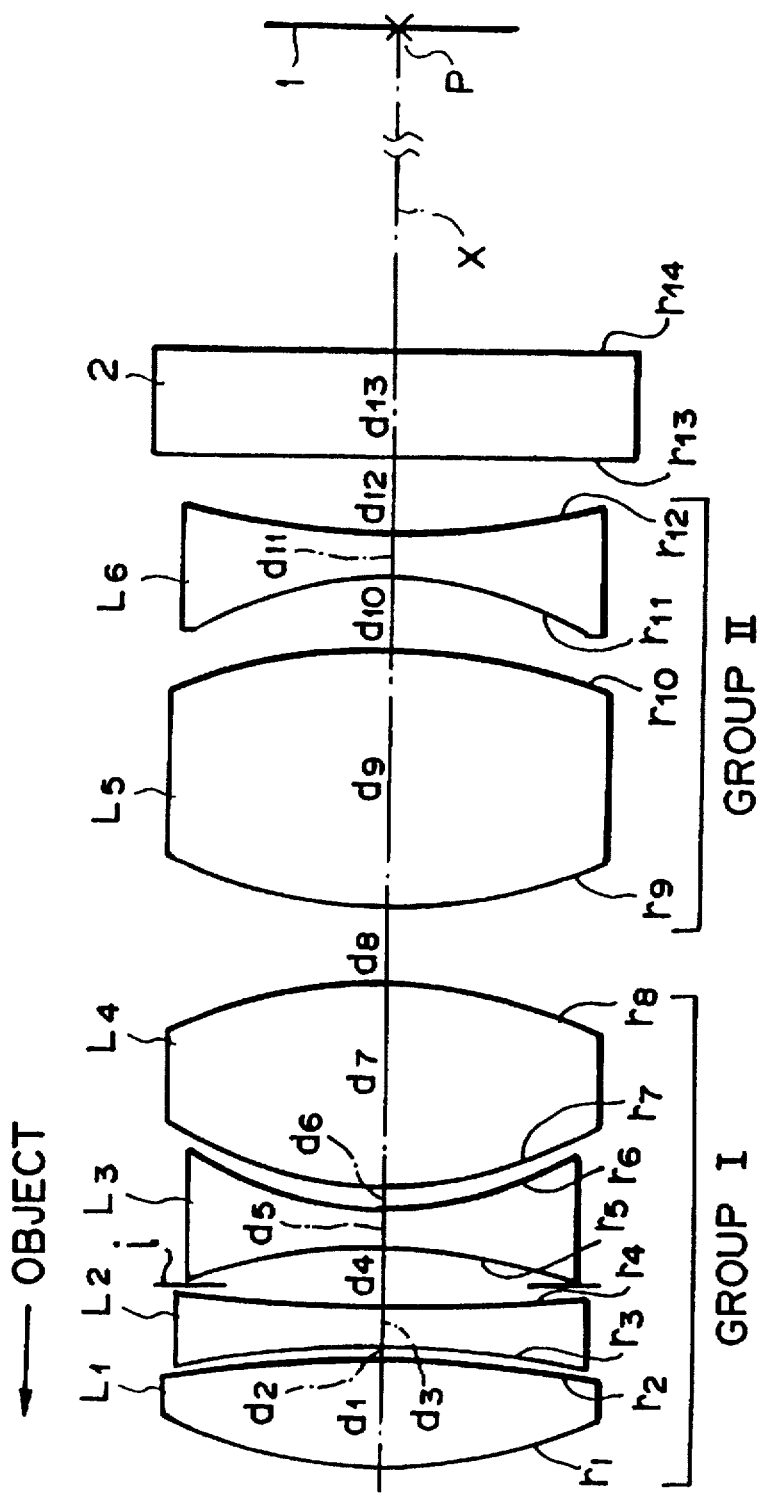
FIG. 3 is a schematic view showing a basic lens configuration in accordance with Embodiment 3 of the present invention.

The imaging lens of Embodiment 3 will be explained with reference to FIG. 3.

The imaging lens of Embodiment 3 has a lens configuration which is substantially the same as that of the imaging lens of the above-mentioned Embodiment 1 but mainly differs therefrom in that the second lens group is constituted by two lenses L5 and L6 and that the surface of the second lens L2 having a stronger curvature is directed toward the object.

Here, all of the above-mentioned conditional expressions (1) to (6) are satisfied, while their respective values are set as shown in Table 9.

Also, in this embodiment, F number and half field angle ω of the imaging lens are 2.50 and 17.4°, respectively.

The following Table 3 shows radius of curvature r (mm) of each lens surface, center thickness of each lens and air gap between neighboring lenses d (mm), and refractive index N of each lens at i—line in this embodiment.

(Embodiment 4)

Figure 4:
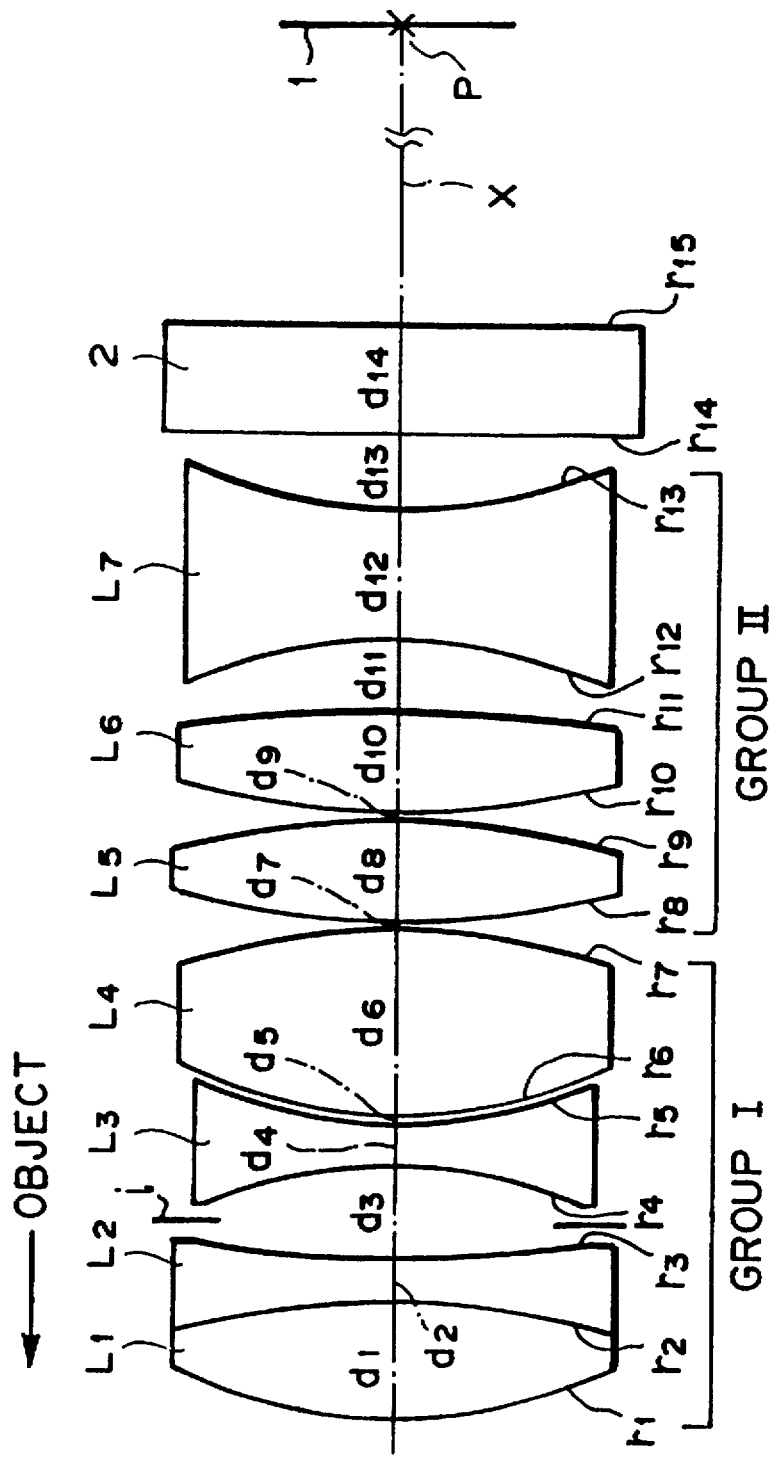
FIG. 4 is a schematic view showing a basic lens configuration in accordance with Embodiment 4 of the present invention.

The imaging lens of Embodiment 4 will be explained with reference to FIG. 4.

The imaging lens of Embodiment 4 has a seven-lens configuration which is substantially the same as that of the imaging lens of the above-mentioned Embodiment 1 but mainly differs therefrom in that the surface of the second lens L2 having a stronger curvature is directed toward the object and that the first lens L1 and the second lens L2 are bonded together.

Here, all of the above-mentioned conditional expressions (1) to (6) are satisfied, while their respective values are set as shown in Table 9.

Also, in this embodiment, F number and half field angle ω of the imaging lens are 2.50 and 17.4°, respectively.

The following Table 4 shows radius of curvature r (mm) of each lens surface, center thickness of each lens and air gap between neighboring lenses d (mm), and refractive index N of each lens at i—line in this embodiment.

(Embodiment 5)

Figure 5:
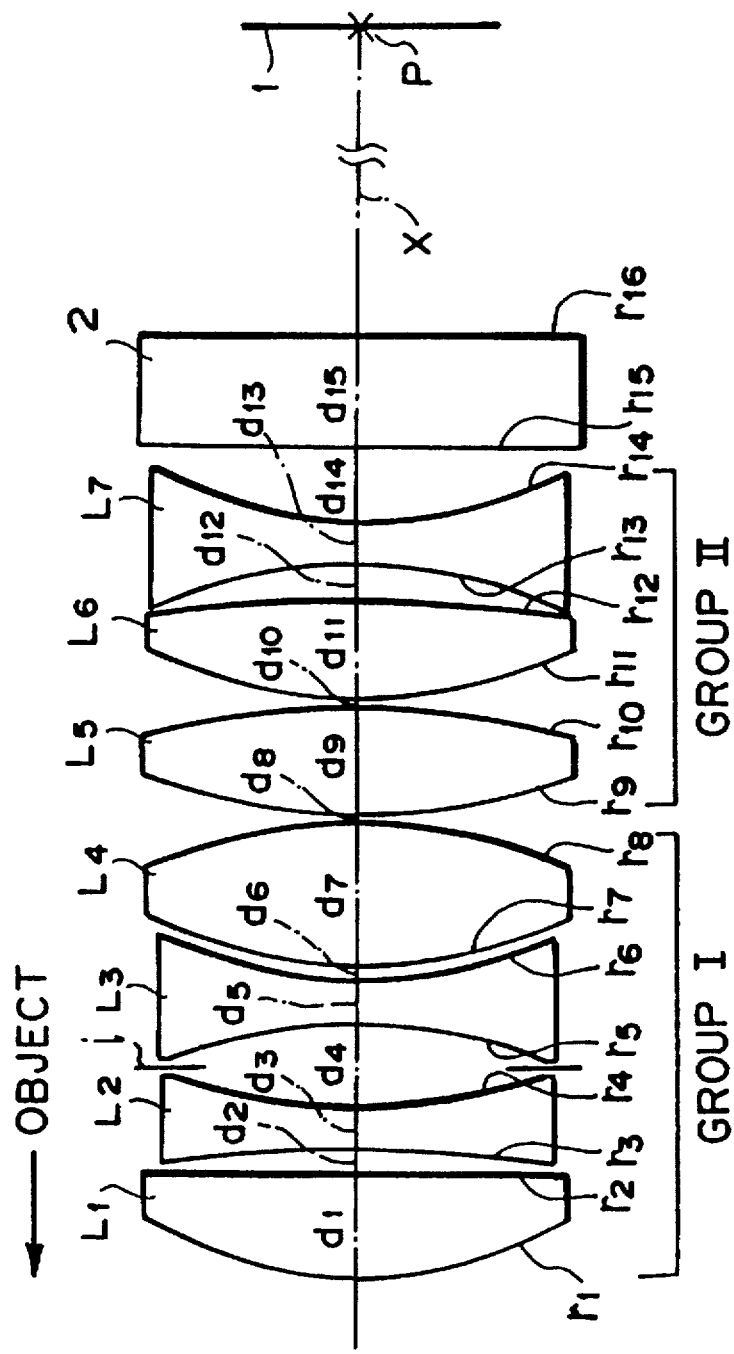
FIG. 5 is a schematic view showing a basic lens configuration in accordance with Embodiment 5 of the present invention.

The imaging lens of Embodiment 5 will be explained with reference to FIG. 5.

The imaging lens of Embodiment 5 has a seven-lens configuration which is substantially the same as that of the imaging lens of the above-mentioned Embodiment 1 but mainly differs therefrom in that the surface of the third lens L3 having a stronger curvature is directed toward the object.

Here, all of the above-mentioned conditional expressions (1) to (6) are satisfied, while their respective values are set as shown in Table 9.

Also, in this embodiment, F number and half field angle ω of the imaging lens are 2.50 and 17.7°, respectively.

The following Table 5 shows radius of curvature r (mm) of each lens surface, center thickness of each lens and air gap between neighboring lenses d (mm), and refractive index N of each lens at i—line in this embodiment.

(Embodiment 6)

The imaging lens of Embodiment 6 will be explained with reference to FIG. 6.

Figure 6:
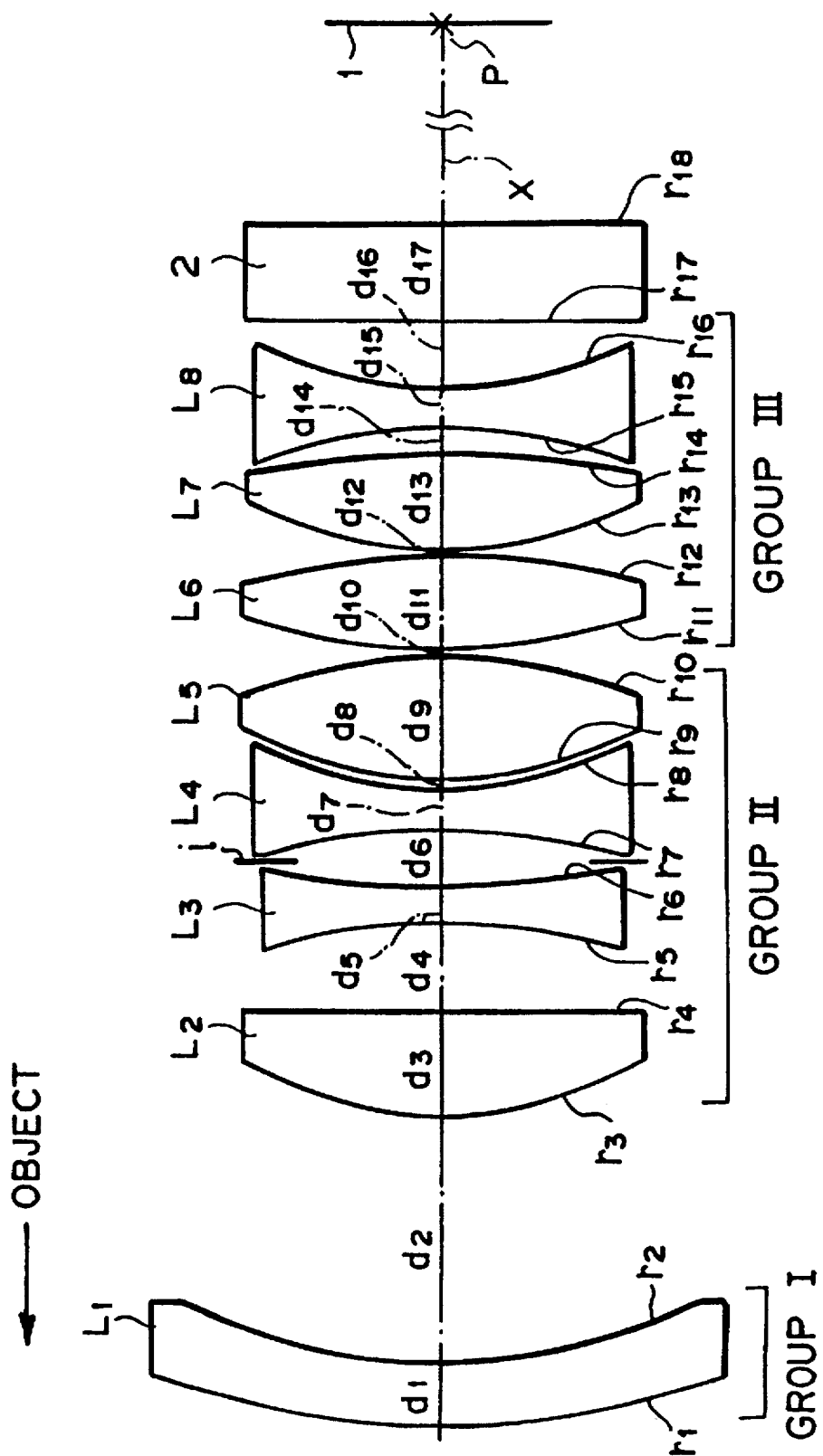
FIG. 6 is a schematic view showing a basic lens configuration in accordance with Embodiment 6 of the present invention.

As shown in FIG. 6, the imaging lens of this embodiment comprises a first lens group, a second lens group, and a third lens group arranged successively from an object side. The first lens group comprises a negative single lens L1. The second lens group comprises, successively from the object side, a positive second lens L2, a negative third lens L3, a negative fourth lens L4, and a positive fifth lens L5. The third lens group comprises three lenses L6, L7, and L8. This imaging lens is configured such that the difference in dispersion between materials constituting the lenses L1 to L8 is smaller than 0.0055 and that the following conditional expressions are satisfied:

$$-6 < F/F1 < 0.0 \tag{7}$$

$$0.0 < F/F2 < 1.4 \tag{8}$$

$$-0.6 < F/F3 < 1.5 \tag{9}$$

$$0.8 < F/fa < 2.0 \tag{10}$$

$$0.0 < |F/fb| < 1.5 \tag{11}$$

$$1.4 < |F/fc| < 3.0 \tag{12}$$

$$1.0 < F/fd < 2.5 \tag{13}$$

wherein:

F: focal length as a whole;

F1: focal length of the first lens group;

F2: focal length of the second lens group;

F3: focal length of the third lens group;

fa: focal length of the positive lens on the object side in the second lens group;

fb: focal length of the negative lens on the object side in the second lens group;

fc: focal length of the negative lens on the image side in the second lens group; and fd: focal length of the positive lens on the image side in the second lens group.

Here, an incident luminous flux along the optical axis X from the object side forms an image at the imaging position P on the imaging surface 1. Also, the stop i is disposed between the third lens L3 and the fourth lens L4, while the cover glass 2 is disposed on the imaging surface side of the lens system.

Here, the first lens L1 is a negative meniscus lens whose convex surface is directed toward the object; the second lens L2 is a plano-convex lens whose convex surface is directed toward the object; the third lens L3 is a biconcave lens whose surface having a stronger curvature is directed toward the object; the fourth lens L4 is a biconcave lens whose surface having a stronger curvature is directed toward the image surface; the fifth lens L5 is a biconvex lens whose surface having a stronger curvature is directed toward the object; each of the sixth lens L6 and the seventh lens L7 is a biconvex lens whose surface having a stronger curvature is directed toward the object; and the eighth lens L8 is a biconcave lens whose surface having a stronger curvature is directed toward the image surface.

Next, the above-mentioned conditional expressions (7) to (13) will be explained.

When F/F1 is below the lower limit of conditional expression, (7), the negative power of the first lens group becomes so strong that the axial ray height of the light incident on the second lens group increases to an extent where it is difficult to correct aberration such as spherical aberration. When F/F1 exceeds its upper limit, by contrast, the positive power of the first lens group becomes so strong that the axial ray height of the light incident on the second lens group decreases to an extent where it is difficult for the second lens group to correct chromatic aberration, while shortening back focus. Accordingly, in this embodiment, the value of F/F1 is set to −0.22 as shown in Table 10 so as to satisfy conditional expression (7), thereby attaining favorable correction of aberration such as spherical aberration or chromatic aberration, while securing a long back focus.

F/F2 is below the lower limit of conditional expression (8), on the other hand, the negative power of the second lens group becomes so strong that the number of lenses has to be increased in order to correct aberration in the third lens group, whereby correction of chromatic aberration may become insufficient. When F/F2 exceeds its upper limit, by contrast, the positive power of the second lens group becomes so strong that the radius of curvature of its convex surface may be too small to secure correction of aberration and surface accuracy of the lenses, while back focus is shortened. Accordingly, in this embodiment, the value of F/F2 is set to 0.22 as shown in Table 10 so as to satisfy conditional expression (8), thereby attaining favorable correction of aberration, in particular, such as chromatic aberration. Therefore, the number of the lenses can be reduced, while securing the surface accuracy of the lenses.

Also, in this imaging lens, while the third lens group having a low axial ray height is used for correcting the Petzval's sum, when F/F3 exceeds the upper limit of the above-mentioned conditional expression (9), the positive power of the third lens group becomes so strong that the Petzval's sum increases to an extent where the image surface is hard to correct. Below the lower limit, by contrast, the negative power of the third lens group becomes so strong that back focus is shortened, while coma and distortion are hard to correct. Accordingly, in this embodiment, the value of F/F3 is set to 1.01 as shown in Table 10 so as to satisfy conditional expression (9), thereby attaining favorable correction of aberration, in particular, such has image surface, coma, or distortion, while securing a predetermined back focus length.

Also, while the second lens group mainly corrects chromatic aberration and spherical aberration, beyond the upper limits of conditional expressions (10), (11), (12), and (13), its lens power becomes so strong that the radius of curvature of its lens surface may be too small to secure favorable correction of spherical aberration and surface accuracy. Below the lower limits thereof, by contrast, the lens power thereof becomes too weak to sufficiently correct chromatic aberration. Accordingly, in this embodiment, values of F/fa, |F/fb|, |F/fc|, and F/fd are respectively set to 1.09, 1.18, 1.80, and 1.74 as shown in Table 10 so as to satisfy conditional expressions (10), (11), (12), and (13), thereby attaining favorable correction of aberration, in particular, such as spherical aberration or chromatic aberration, while making it possible to secure the surface accuracy of the lenses.

In this embodiment, as in the case of the above-mentioned Embodiments 1 to 5, while crystals of fluorite, quartz, and the like having favorable light transmittance ratios in ultraviolet region can be used as materials for forming lenses, even when the lenses are formed by such lens forming materials having a small difference in dispersion therebetween, various kinds of aberration can be made favorable. Further, in the case where, as the material for forming each lens, a material having a light transmittance of 50% or higher with respect to light having a wavelength of 300 to 800 nm when the material has a thickness of 10 mm is selected, it is possible to form a lens which can be suitably used within the range from ultraviolet region to visible light region.

Also, in this embodiment, F number and half field angle ω of the imaging lens are 2.50 and 17.6°, respectively.

The following Table 6 shows radius of curvature r (mm) of each lens surface, center thickness of each lens and air gap between neighboring lenses d (mm), and refractive index N of each lens at i—line in this embodiment.

(Embodiment 7)

Figure 7:
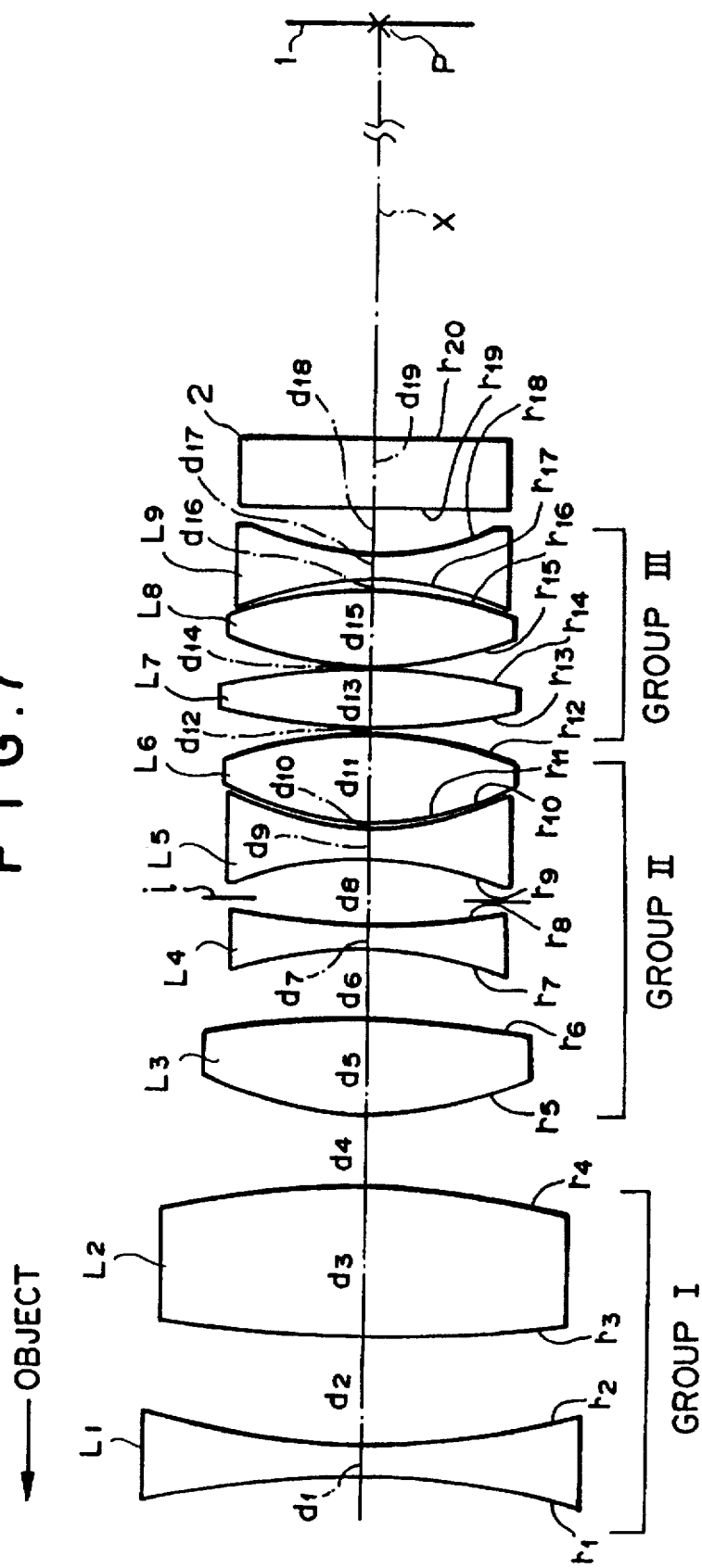
FIG. 7 is a schematic view showing a basic lens configuration in accordance with Embodiment 7 of the present invention.

The imaging lens of Embodiment 7 will be explained with reference to FIG. 7.

The imaging lens of Embodiment 7 has a lens configuration which is substantially the same as that of the imaging lens of the above-mentioned Embodiment 6 but mainly differs therefrom in that the first lens group is constituted by two lenses L1 and L2.

Here, all of the above-mentioned conditional expressions (7) to (13) are satisfied, while their respective values are set as shown in Table 10.

Also, in this embodiment, F number and half field angle ω of the imaging lens are 2.50 and 17.7°, respectively.

The following Table 7 shows radius of curvature r (mm) of each lens surface, center thickness of each lens and air gap between neighboring lenses d (mm), and refractive index N of each lens at i—line in this embodiment.

(Embodiment 8)

Figure 8:
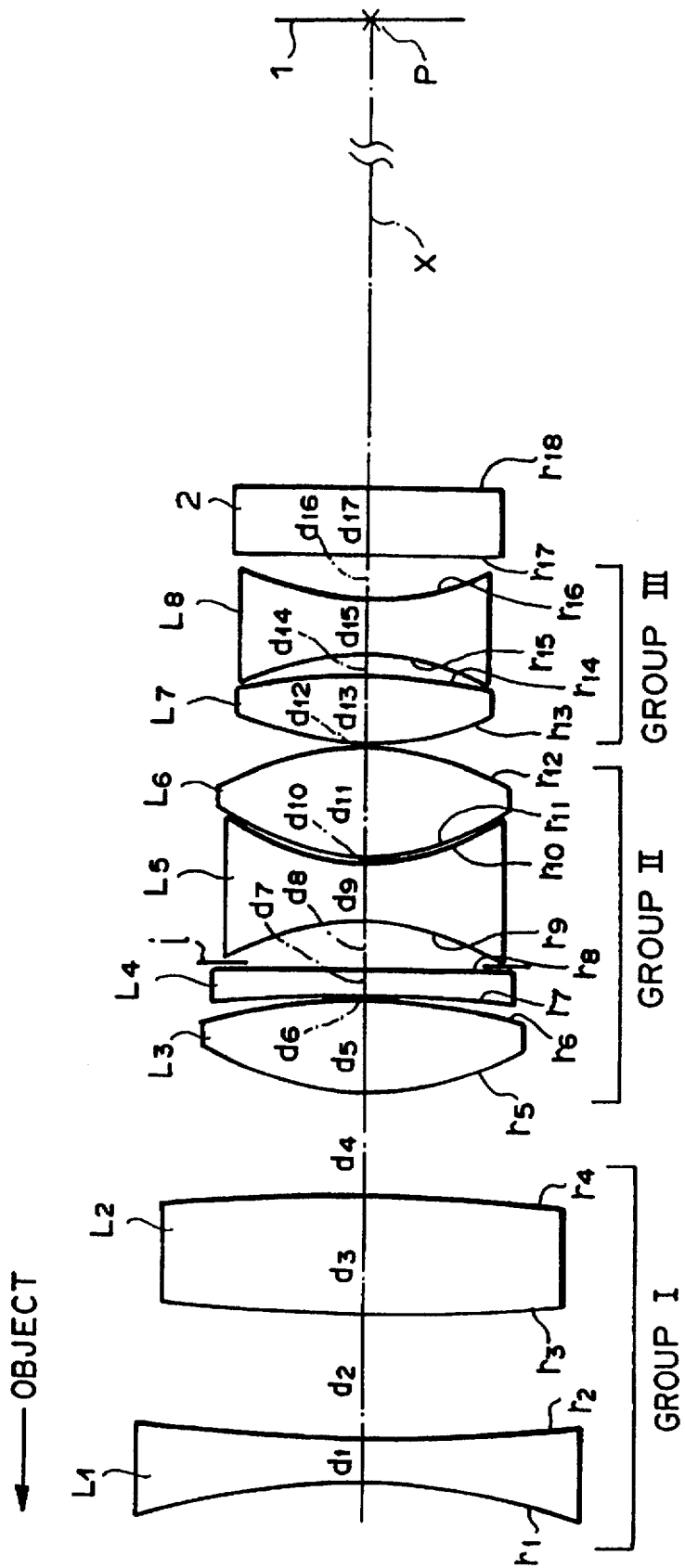
FIG. 8 is a schematic view showing a basic lens configuration in accordance with Embodiment 8 of the present invention.
Figures 9A, 9B, 9C, 9D:
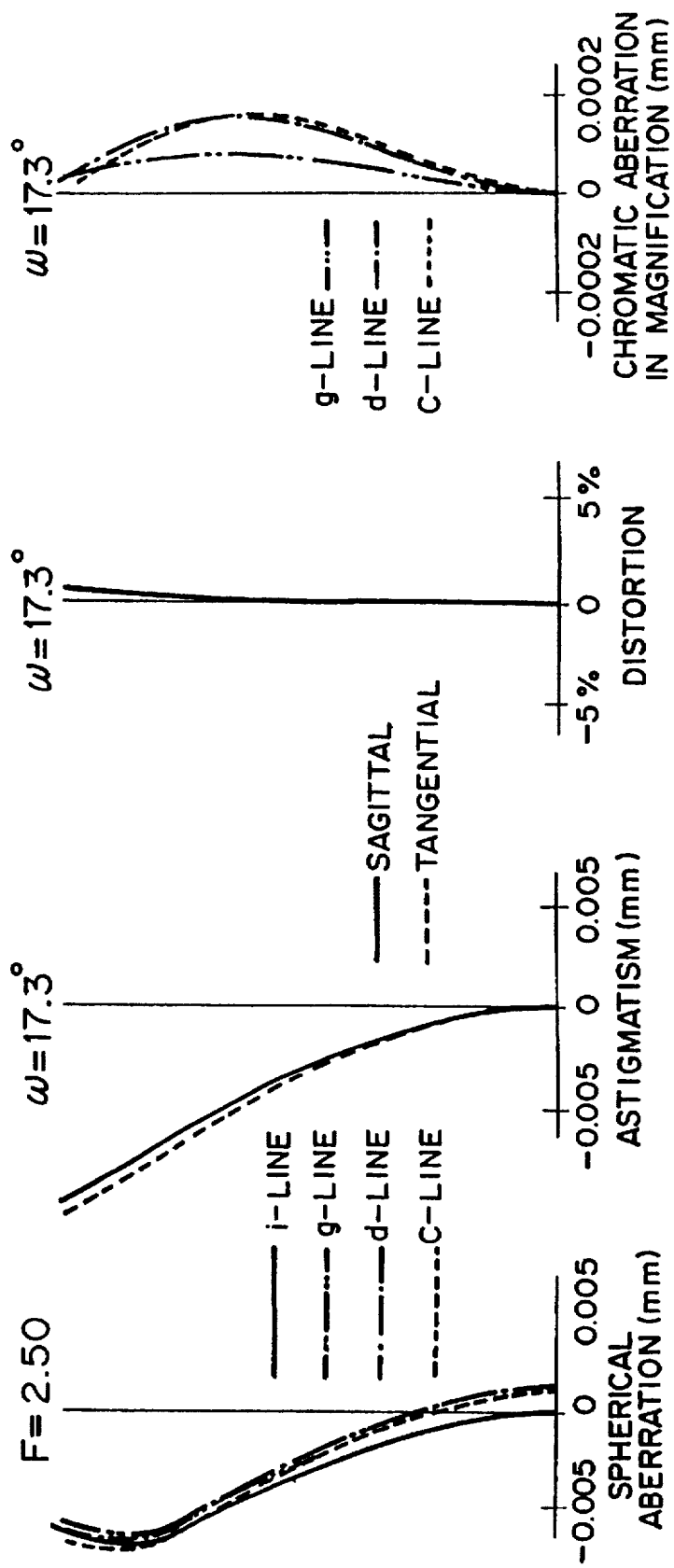
FIG. 9 is an aberration chart of the lens in accordance with Embodiment 1.
Figure 11D:
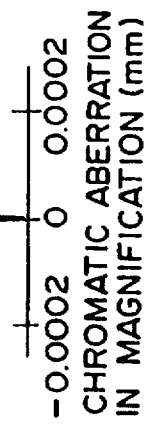
FIG. 11 is an aberration chart of the lens in accordance with Embodiment 3.
Figure 11C:
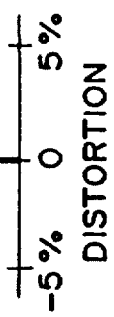
Figure 11B:
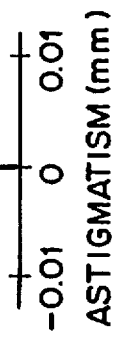
Figure 11A:
Figures 12A, 12B, 12C, 12D:
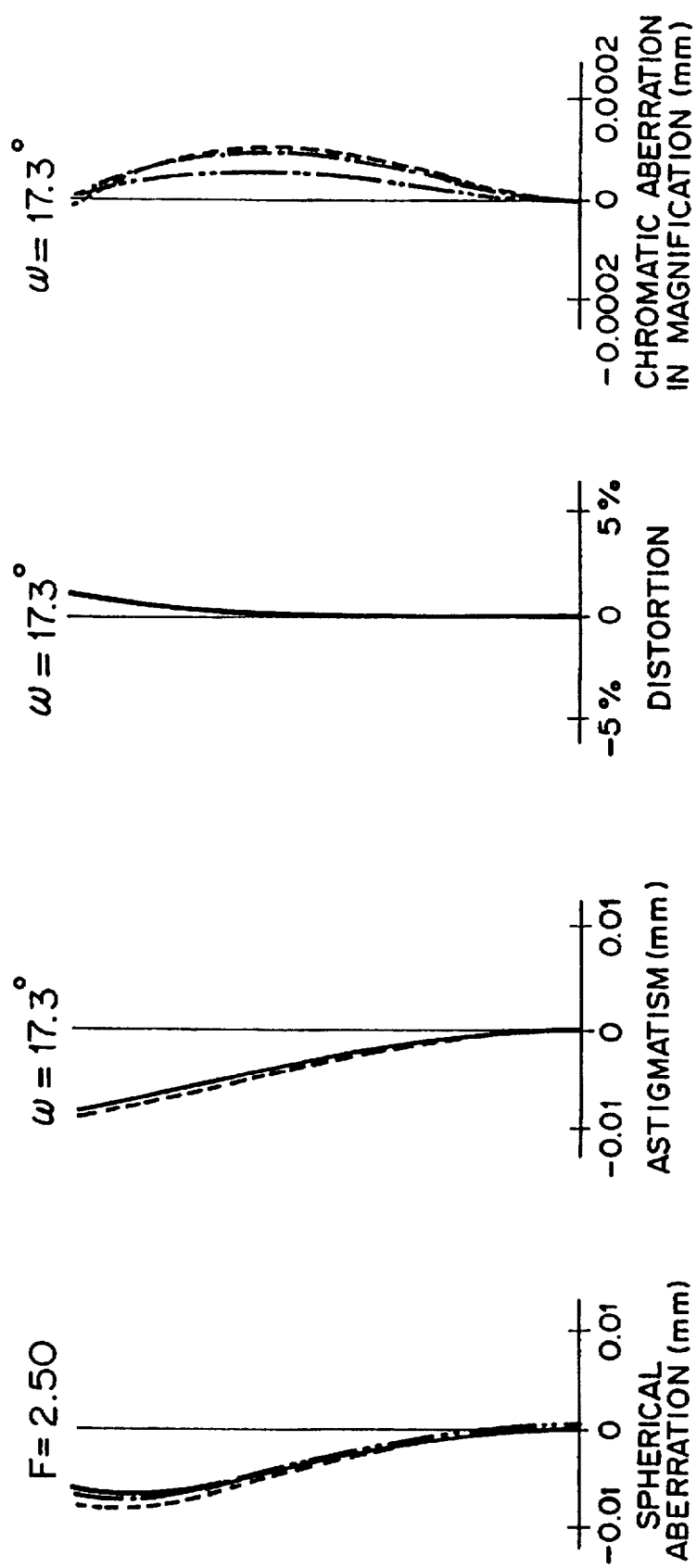
FIG. 12 is an aberration chart of the lens in accordance with Embodiment 4.
Figures 16A, 16B, 16C, 16D:
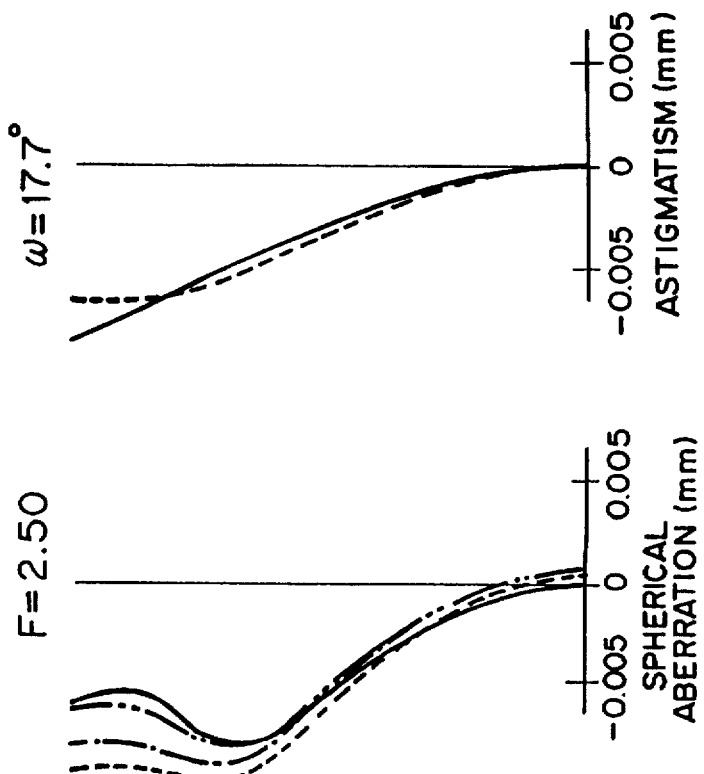
FIG. 16 is an aberration chart of the lens in accordance with Embodiment 8.

The imaging lens of Embodiment 8 will be explained with reference to FIG. 8.

The imaging lens of Embodiment 8 has a lens configuration which is substantially the same as that of the imaging lens of the above-mentioned Embodiment 6 but mainly differs therefrom in that the first lens group is constituted by two lenses L1 and L2 and that the third lens group is constituted by two lenses L7 and L8.

Here, all of the above-mentioned conditional expressions (7) to (13) are satisfied, while their respective values are set as shown in Table 10.

Also, in this embodiment, F number and half field angle ω of the imaging lens are 2.50 and 17.7°, respectively.

The following Table 8 shows radius of curvature r (mm) of each lens surface, center thickness of each lens and air gap between neighboring lenses d (mm), and refractive index N of each lens at i—line in this embodiment.

FIGS. 9 to 16 show aberration charts (for spherical aberration, astigmatism, distortion, and chromatic aberration in magnification) corresponding to Embodiments 1 to 8, respectively. In these aberration charts, ω indicates the half field angle. As can be seen from FIGS. 9 to 16, all of the above-mentioned various kinds of aberration can be made favorable in accordance with the foregoing embodiments.

Each chart for spherical aberration shows aberrations with respect to i—line, g—line, e—line, and C—line, whereas each chart for chromatic aberration in magnification shows aberrations of g—line, e—line, and C—line with respect to i—line. Also, each chart for astigmatism shows aberrations with respect to sagittal (S) image surface and tangential (T) image surface. Here, curves in graphs concerning spherical aberration, astigmatism, and chromatic aberration in magnification are explained only in FIG. 9. The curves in FIGS. 10 to 16 are not explained since they are similar to those in FIG. 9.

Figure 17:
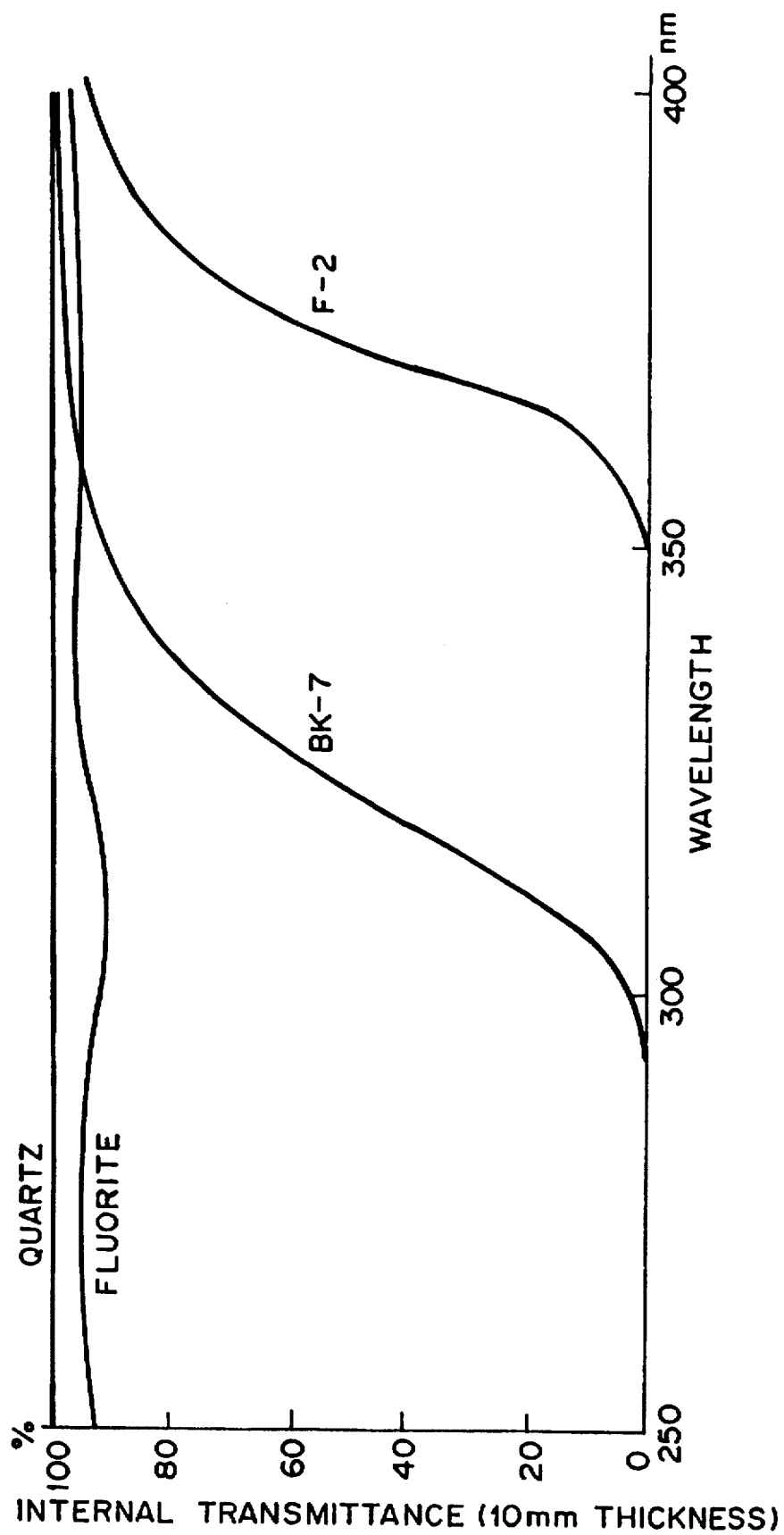
FIG. 17 is a graph showing light transmittance characteristics of fluorite and quartz.

FIG. 17 is a graph showing transmittance characteristics of fluorite and quartz. In addition to these materials, this graph shows transmittance characteristics of BK—7 and F—2 which are typical lens glass materials. Fluorite and quartz used in the foregoing embodiments both have favorable transmittance characteristics in ultraviolet region such that their transmittance ratio becomes 80% or higher at a wavelength of 300 to 400 nm when their thickness is 10 nm.

Also, while not depicted in FIG. 17, they have a transmittance of 80% or higher with respect to light having a wavelength of 400 to 800 nm as well. In practice, a lens which can be suitably used within the range from ultraviolet region to visible light region can be made of a material having a transmittance of 50% or higher at a wavelength of 300 to 800 nm.

Also, in general, correction of chromatic aberration becomes harder as the difference in dispersion between a plurality of kinds of lens materials constituting the lens system is smaller. While the difference in dispersion between BK—7 and F—2, which are most popular lens materials, is about 0.0090, correction of chromatic aberration becomes quite difficult when the difference in dispersion is smaller than 0.0055.

In the case of fluorite (with a dispersion of 0.004567) and quartz (with a dispersion of 0.006760) used in the embodiments, their difference in dispersion is about 0.0022 which is quite small. Nevertheless, even under such a condition where chromatic aberration is hard to correct, the imaging lenses of the foregoing embodiments can correct chromatic aberration sufficiently well, while favorably correcting other kinds of aberration, thereby exhibiting excellent characteristics.

Here, without being restricted to the above-mentioned embodiments, the imaging lens of the present invention can be modified in various manners. For example, the curvature r and lens distance (or lens thickness) d of each lens can be appropriately changed.

Also, lens materials other than fluorite and quartz can be used for forming the imaging lens of the present invention so as to favorably correct various kinds of aberration as long as these plurality of kinds of lens materials satisfy conditional expressions (1) to (6) or (7) to (13) while their difference in dispersion is smaller than 0.0055.

As explained in the foregoing, in accordance with the imaging lens of the present invention, a high brightness and a wide field angle can be obtained while using lens materials whose difference in dispersion therebetween is small. Also, chromatic aberration can be favorably corrected, while the Petzval's sum can be kept sufficiently low. Accordingly, various kinds of aberration can be favorably corrected.

Therefore, even when lens materials having a small difference in dispersion therebetween, though, with a favorable transmittance in ultraviolet region, such as quartz and fluorite, are used, an imaging lens exhibiting a favorable characteristic can be formed.

TABLE 1

| m | r | d | N |
|---|---|---|---|
| 1 | 0.476 | 0.102 | 1.4449 |
| 2 | −2.001 | 0.018 | |
| 3 | −1.045 | 0.052 | 1.4745 |
| 4 | 0.952 | 0.061 | |
| 5 | −0.604 | 0.039 | 1.4745 |
| 6 | 0.381 | 0.008 | |
| 7 | 0.401 | 0.116 | 1.4449 |
| 8 | −0.689 | 0.052 | |
| 9 | 0.548 | 0.229 | 1.4449 |
| 10 | −0.649 | 0.032 | |
| 11 | 0.657 | 0.098 | 1.4449 |
| 12 | −2.191 | 0.043 | |
| 13 | −0.425 | 0.065 | 1.4745 |
| 14 | 0.514 | 0.070 | |
| 15 | ∞ | 0.100 | 1.4745 |
| 16 | ∞ | | |

TABLE 2

| m | r | d | N |
|---|---|---|---|
| 1 | 0.470 | 0.107 | 1.4449 |
| 2 | −0.837 | 0.006 | |
| 3 | −0.851 | 0.039 | 1.4745 |
| 4 | 1.329 | 0.067 | |
| 5 | −0.426 | 0.052 | 1.4745 |
| 6 | 0.444 | 0.194 | 1.4449 |
| 7 | −0.578 | 0.004 | |
| 8 | 0.901 | 0.090 | 1.4449 |
| 9 | −0.744 | 0.004 | |
| 10 | 0.806 | 0.128 | 1.4449 |
| 11 | −1.420 | 0.062 | |
| 12 | −0.489 | 0.118 | 1.4745 |
| 13 | 0.546 | 0.070 | |
| 14 | ∞ | 0.100 | 1.4745 |
| 15 | ∞ | | |

TABLE 3

| m | r | d | N |
|---|---|---|---|
| 1 | 0.427 | 0.108 | 1.4449 |
| 2 | −1.084 | 0.009 | |
| 3 | −0.918 | 0.039 | 1.4745 |
| 4 | 1.984 | 0.053 | |
| 5 | −0.568 | 0.039 | 1.4745 |
| 6 | 0.341 | 0.020 | |
| 7 | 0.387 | 0.191 | 1.4449 |
| 8 | −0.470 | 0.078 | |
| 9 | 0.501 | 0.235 | 1.4449 |
| 10 | −0.557 | 0.066 | |
| 11 | −0.349 | 0.039 | 1.4745 |
| 12 | 0.763 | 0.070 | |
| 13 | ∞ | 0.100 | 1.4745 |
| 14 | ∞ | | |

TABLE 4

| m | r | d | N |
|---|---|---|---|
| 1 | 0.447 | 0.113 | 1.4449 |
| 2 | −0.745 | 0.039 | 1.4745 |
| 3 | 1.111 | 0.090 | |
| 4 | −0.437 | 0.039 | 1.4745 |
| 5 | 0.430 | 0.009 | |
| 6 | 0.448 | 0.178 | 1.4449 |
| 7 | −0.590 | 0.004 | |
| 8 | 0.810 | 0.096 | 1.4449 |
| 9 | −0.734 | 0.004 | |
| 10 | 0.753 | 0.100 | 1.4449 |
| 11 | −1.236 | 0.063 | |
| 12 | −0.471 | 0.118 | 1.4745 |
| 13 | 0.503 | 0.070 | |
| 14 | ∞ | 0.100 | 1.4745 |
| 15 | ∞ | | |

TABLE 5

| m | r | d | N |
|---|---|---|---|
| 1 | 0.381 | 0.101 | 1.4449 |
| 2 | −30.690 | 0.020 | |
| 3 | −1.388 | 0.039 | 1.4745 |
| 4 | 0.583 | 0.081 | |
| 5 | −0.458 | 0.039 | 1.4745 |
| 6 | 0.463 | 0.014 | |
| 7 | 0.478 | 0.134 | 1.4449 |
| 8 | −0.525 | 0.004 | |
| 9 | 0.610 | 0.104 | 1.4449 |
| 10 | −0.771 | 0.004 | |
| 11 | 0.482 | 0.096 | 1.4449 |
| 12 | −1.234 | 0.029 | |
| 13 | −0.504 | 0.039 | 1.4745 |
| 14 | 0.420 | 0.070 | |
| 15 | ∞ | 0.100 | 1.4745 |
| 16 | ∞ | | |

TABLE 6

| m | r | d | N |
|---|---|---|---|
| 1 | 0.862 | 0.068 | 1.4745 |
| 2 | 0.597 | 0.263 | |
| 3 | 0.410 | 0.111 | 1.4449 |
| 4 | ∞ | 0.089 | |
| 5 | −0.667 | 0.039 | 1.4745 |
| 6 | 1.036 | 0.058 | |
| 7 | −0.659 | 0.042 | 1.4745 |
| 8 | 0.448 | 0.008 | |
| 9 | 0.450 | 0.129 | 1.4449 |
| 10 | −0.542 | 0.004 | |
| 11 | 0.671 | 0.098 | 1.4449 |
| 12 | −0.786 | 0.004 | |
| 13 | 0.466 | 0.100 | 1.4449 |
| 14 | −0.984 | 0.024 | |
| 15 | −0.513 | 0.039 | 1.4745 |
| 16 | 0.426 | 0.070 | |
| 17 | ∞ | 0.100 | 1.4745 |
| 18 | ∞ | | |

TABLE 7

| m | r | d | N |
|---|---|---|---|
| 1 | −1.381 | 0.051 | 1.4745 |
| 2 | 1.104 | 0.168 | |
| 3 | 2.076 | 0.234 | 1.4745 |
| 4 | −1.243 | 0.112 | |
| 5 | 0.569 | 0.145 | 1.4449 |
| 6 | −1.368 | 0.104 | |
| 7 | −0.686 | 0.039 | 1.4745 |
| 8 | 1.164 | 0.100 | |
| 9 | −0.573 | 0.045 | 1.4745 |
| 10 | 0.453 | 0.006 | |
| 11 | 0.459 | 0.144 | 1.4449 |
| 12 | −0.563 | 0.004 | |
| 13 | 0.946 | 0.094 | 1.4449 |
| 14 | −0.894 | 0.004 | |
| 15 | 0.588 | 0.117 | 1.4449 |
| 16 | −0.578 | 0.013 | |
| 17 | −0.491 | 0.039 | 1.4745 |
| 18 | −0.462 | 0.070 | |
| 19 | ∞ | 0.100 | 1.4745 |
| 20 | ∞ | | |

TABLE 8

| m | r | d | N |
|---|---|---|---|
| 1 | −1.121 | 0.069 | 1.4745 |
| 2 | 3.034 | 0.202 | |
| 3 | 3.356 | 0.185 | 1.4745 |
| 4 | −2.993 | 0.160 | |
| 5 | 0.476 | 0.143 | 1.4449 |
| 6 | −0.916 | 0.004 | |
| 7 | −2.700 | 0.039 | 1.4745 |
| 8 | ∞ | 0.074 | |
| 9 | −0.438 | 0.087 | 1.4745 |
| 10 | 0.380 | 0.007 | |
| 11 | 0.386 | 0.171 | 1.4449 |
| 12 | −0.428 | 0.004 | |

TABLE 8-continued

| m | r | d | N |
|---|---|---|---|
| 13 | 0.469 | 0.106 | 1.4449 |
| 14 | −0.847 | 0.027 | |
| 15 | −0.451 | 0.084 | 1.4745 |
| 16 | 0.461 | 0.070 | |
| 17 | ∞ | 0.100 | 1.4745 |
| 18 | ∞ | | |

TABLE 9

| expressions | Embod. 1 | Embod. 2 | Embod. 3 | Embod. 4 | Embod. 5 |
|---|---|---|---|---|---|
| (1) | 0.40 | 0.31 | 0.70 | 0.27 | 0.04 |
| (2) | 0.94 | 0.64 | 0.09 | 0.71 | 0.98 |
| (3) | 1.14 | 1.44 | 1.42 | 1.55 | 1.18 |
| (4) | 0.96 | 0.92 | 0.76 | 1.07 | 1.16 |
| (5) | 2.06 | 2.23 | 2.26 | 2.22 | 2.09 |
| (6) | 1.70 | 1.67 | 1.95 | 1.66 | 1.71 |

TABLE 10

| expressions | Embod. 6 | Embod. 7 | Embod. 8 |
|---|---|---|---|
| (7) | −0.22 | −0.05 | −0.23 |
| (8) | 0.22 | 0.17 | 1.06 |
| (9) | 1.01 | 0.77 | −0.39 |
| (10) | 1.09 | 1.08 | 1.38 |
| (11) | 1.18 | 1.11 | 0.18 |
| (12) | 1.80 | 1.90 | 2.41 |
| (13) | 1.74 | 1.68 | 2.05 |

What is claimed is:

1. An imaging lens comprising a first lens group, a second lens group, and a third lens group arranged successively from an object side;

said first lens group being negative as a whole;

said second lens group comprising, successively from the object side, a positive first lens, a negative second lens, a negative third lens, and a positive fourth lens;

said third lens group comprising at least two lenses;

wherein said imaging lens is configured such that difference in dispersion between materials constituting said lenses is smaller than 0.0055 and that the following conditional expressions are satisfied:

$-6 < F/F1 < 0.0$ $0.0 < F/F2 < 1.4$ $-0.6 < F/F3 < 1.5$ $0.8 < F/fa < 2.0$ $0.0 < |F/fb| < 1.5$ $1.4 < |F/fc| < 3.0$ $1.0 < F/fd < 2.5$ wherein:

F: focal length as a whole;

F1: focal length of the first lens group;

F2: focal length of the second lens group;

F3: focal length of the third lens group;

fa: focal length of the positive lens on the object side in the second lens group;

fb: focal length of the negative lens on the object side in the second lens group;

fc: focal length of the negative lens on an image side in the second lens group; and fd: focal length of the positive lens on the image side in the second lens group.

2. An imaging lens according to claim 1, wherein the material forming each of said lenses has a light transmittance of 50% or higher with respect to light having a wavelength of 300 to 800 nm when said material has a thickness of 10 mm.

3. An imaging lens according to claim 2, wherein the materials forming said lenses comprise fluorite and quartz, said first lens and fourth lens in said second lens group being made of fluorite, while said second lens and said third lens being made of quartz.

* * * * *